April 28, 1970   S. B. SMITH, JR., ET AL   3,508,813
ADJUSTABLE SLIT SYSTEM FOR USE IN SPECTROANALYSIS APPARATUS
Filed March 24, 1967

United States Patent Office  3,508,813
Patented Apr. 28, 1970

3,508,813
ADJUSTABLE SLIT SYSTEM FOR USE IN SPECTROANALYSIS APPARATUS
Stanley Babcock Smith, Jr., Lexington, and Jerrold Zindler, Cambridge, Mass., assignors to Instrumentation Laboratory, Inc., Watertown, Mass., a corporation of Massachusetts
Filed Mar. 24, 1967, Ser. No. 625,862
Int. Cl. G02f 1/30; G01j 3/12
U.S. Cl. 350—275                                11 Claims

ABSTRACT OF THE DISCLOSURE

A monochromator having an entrance and exit slit defining structure comprising a disc having seven pairs of matched slits formed in a series along a radius about the disc axis. The disc is mounted for rotation about the monochromator axis.

The disc, in one embodiment, includes a transparent quartz substrate and an opaque aluminum film deposited thereon in which the pairs of matched slits of fixed width and length are formed. Each pair of matched slits differs in width from the other pairs of slits on the disc and the slits of each matched pair are located radially opposite each other for positioning selectively at the entrance and exit positions of the monochromator. The entrance slit of each pair is narrower than the exit slit of that pair.

SUMMARY OF INVENTION

This invention relates to spectroanalysis apparatus and more particularly to an entrance and exit slit system useful in such apparatus.

In spectroanalysis apparatus it is necessary to provide long, narrow slits at entrance and exit positions therein through which radiation passes. In many contexts it is desirable that the slits be adjustable to compensate for available radiation levels and resolution requirements. The slits must be highly accurate in width.

In the past such adjustable slits have been provided in numerous complex ways involving inter alia relatively movable members and micrometer or pressure members for adjusting the slits formed by such members. Not only are the structures complex but so is the manner of adjustment. And in some of these structures wear of movable members results in loss of accuracy over a period of use. In some of these structures it is also impossible to adjust slit width as rapidly as is desirable.

It is, therefore, a principal object of this invention to provide, in spectroanalysis apparatus, a slit system which combines the advantages of high accuracy and adjustability with those of simplicity and inexpensiveness. Another object of this invention is to provide a novel and improved slit system permitting easy, rapid adjustment of slit opening sizes in accordance with available light energy and resolution requirements. Another object of the invention is to provide a novel and improved slit system for spectroanalysis apparatus permitting accurate adjustment of slits to predetermined widths. Still another object of this invention is to provide a novel and improved system incorporating curved slits which are particularly useful in reducing astigmatism in monochromators of the Ebert and Czerny-Turner types. Still another object of this invention is to improve the stability of spectroanalysis apparatus of the type that includes monochromators, spectroscopes, spectrometers, spectrographs, etc. And yet another object is to eliminate loss of accuracy from wear engendered by use.

In general, this invention features a slit system comprising a planar member adapted to extend across the entrance and exit portions of spectroanalysis apparatus. The member has a plurality of pairs of matched slits formed therein. The slits of each pair differ in size from the slits of the other pairs and one slit of each pair being spaced from the other slit of such pair such that the entrance and exit slits of each matched pair may be simultaneously positioned at the entrance and exit positions respectively of the apparatus. In a preferred embodiment of this invention the slits of each pair are curved along a common radius and differ in width from each other, the exit slit being wider.

Other objects, features, and advantages of this invention will be apparent to those skilled in the art from the following detailed description of a preferred embodiment thereof together with the accompanying drawings in which.

DESCRIPTION OF PARTICULAR EMBODIMENT

Figure 1:
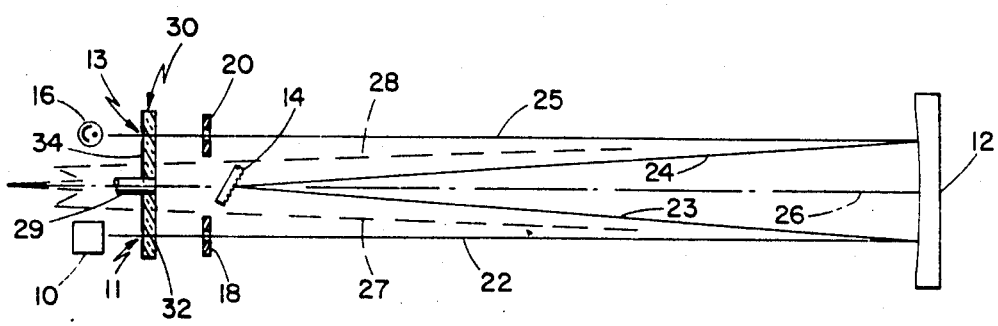
FIG. 1 is a diagrammatic plan view of a monochromator employing the invention.

With reference to the drawings, FIG. 1 illustrates a monochromator employing the invention. A beam 22 of energy from radiant energy source 10 is directed through an entrance slit in slit member 30, through baffle 18 to mirror 12 which reflects beam 23 to grating 14. Beam 24 is then reflected by grating 14 to mirror 12 and beam 25 is in turn reflected from the mirror 12 through baffle 20 through an exit slit in member 30 to a sensor 16. The system has two symmetries such that lines 27, 28, normal to the surface of the mirror bisect the angles respectively between beams 22, 23 and 24, 25, the grating being positioned at the axis of the system.

Figure 3:
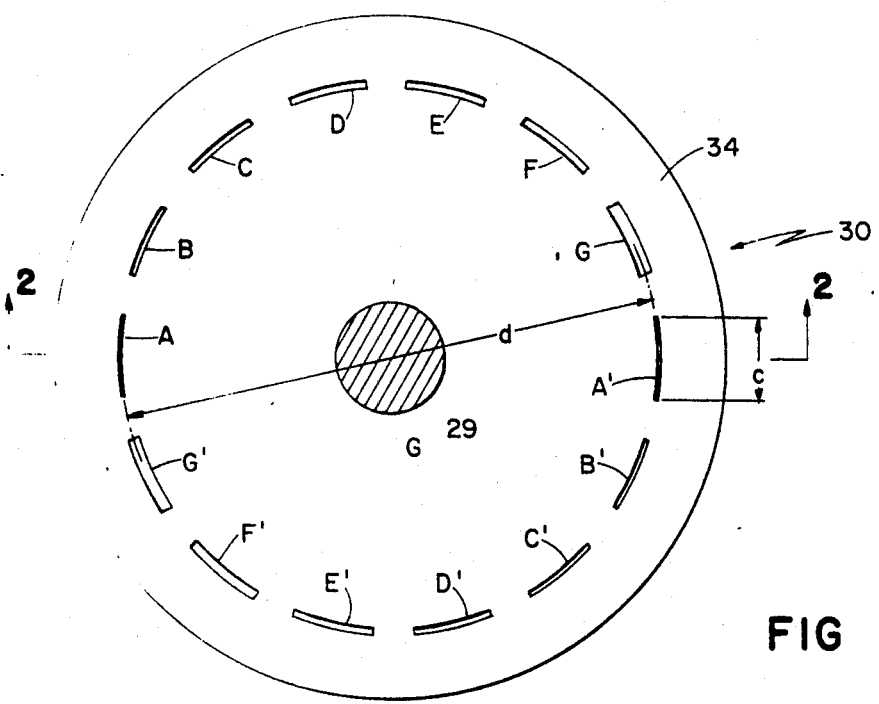
FIG. 3 is an enlarged elevational view of a disc according to the invention.

Member 30 is a planar disc concentrically mounted on brass shaft 29 which is positioned along the axis of the monochromator. The slits in member 30 are shown best in FIG. 3 and comprise a plurality of matched pairs of slits AA'–GG', inclusive.

Disc 30 comprises a substrate 32 and a radiation opaque film 34 supported thereon, in which the slits are formed. Substrate 32 is radiation transparent, at least at the slits. In the illustrated embodiment, the substrate is of 2 mm. thickness optical quality quartz and the film 34 is a 0.001" thick coating of aluminum on one side only of the quartz. In another embodiment (not shown), the substrate 32 is copper and the film 34 is a coating of nickel, the copper substrate 34 having apertures (and hence "transparent" within the meaning of that word for present purposes) at the slits.

The slits may be either photoetched in the film 34 or ruled, i.e., cut with a diamond stylus. In the case of a copper substrate 32, the apertures at the slits are etched in the copper after the slits are first formed. Each pair of slits must be matched accurately, i.e., be parallel to each other or, in the case of the curved slits illustrated, lie along the same circle and be spaced accurately from each other relative to the entrance and exit positions 11, 13 of the monochromator. In a typical monochromator employing a disc, the slits AA'–GG' inclusive all lie along the same circle defined by the centers of the slits and the diameter $d$ of the circle is 2.666" within a tolerance of ±0.0001". The slits are of equal length, 0.394"± 0.005", as measured along a chord $c$ of their circle.

Each pair of slits varies in width from the other pairs of slits to provide slit adjustability. In addition, the stability of the monochromator is improved by varying the widths of the slits of each pair relative to each other.

Figure 2:
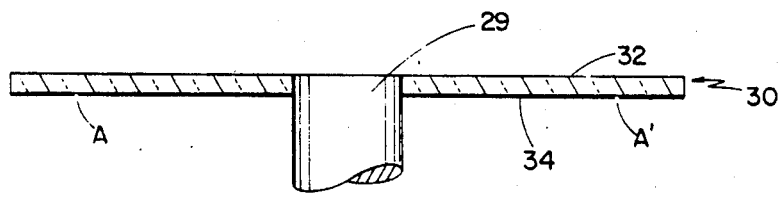
FIG. 2 is a sectional view along the line 2—2 of FIG. 3.

Preferred slit widths for the slits of each pair illustrated in FIG. 2 are set forth in the table below:

TABLE OF SLIT WIDTHS (IN MICRONS)

| Entrance Slit | Width | Exit Slit | Width |
|---|---|---|---|
| A | 10±2 | A' | 15±2.5 |
| B | 20±2.5 | B' | 30±4 |
| C | 40±4 | C' | 60±6 |
| D | 80±8 | D' | 120±12 |
| E | 160±10 | E' | 200±20 |
| F | 320±15 | F' | 400±40 |
| G | 2000±50 | G' | 2000±50 |

In mounting the disc 30 on shaft 29 care must be utilized to assure concentricity of the slits relative to the system axis. This may be accomplished by providing a 0.005" clearance between the disc 30 and shaft 29 and by fastening the disc to the shaft with a slow hardening cement and by making any necessary adjustments before the cement hardens.

In use, a pair of slits, e.g., CC', are respectively positioned at the entrance and exit positions 11, 13 of the monochromator. If adjustment is necessary, the operator simply rotates shaft 29 to place smaller or larger slits, e.g., AA' or FF', at the entrance and exit positions 11, 13.

Although this invention has been described with reference to a rotatable disc, it will be understood that other planar members may be utilized, e.g., a longitudinally movable rectangular plate or the like.

Other embodiments of this invention will occur to those skilled in the art which are within the spirit and scope of the following claims.

What is claimed is:

1. In spectroanalysis apparatus having spaced radiation entrance and exit positions, a slit system comprising
   a planar member extending across said entrance and exit positions of said apparatus;
   a plurality of pairs of matched slits formed in said member, one slit of each said pair of slits being spaced from the other slit of such pair a distance equal to the distance between said entrance and exit positions for simultaneous positioning of one slit of a pair at said entrance position and the other slit of such pair at said exit position, the slits of one said pair having different widths from the corresponding slits of other said pairs;
   said member being movably mounted in said apparatus for selectively positioning said pairs at said entrance and exit positions and for selectively changing the pair thereat.

2. The system claimed in claim 1 in which one slit of one pair differs in width from the other slit of said one pair.

3. The system claimed in claim 1 in which said member includes a substate and a film secured to said substrate, said slits being formed in said film.

4. The system claimed in claim 3 wherein said substrate is of radiation transparent material and said film is of radiation opaque material.

5. The system claimed in claim 1 in which said member is a disc mounted between said positions and said slits are equidistantly spaced from the axis of said disc.

6. The system claimed in claim 5 in which said slits are curved and are disposed along a circle concentric with the axis of said disc.

7. The system claimed in claim 5 in which said disc axis is positioned equidistantly from said positions, and said slits of each pair are disposed 180° apart.

8. The system claimed in claim 7 in which said member includes a substrate and a film secured to said substrate, said slits being formed in said film.

9. The system claimed in claim 8 wherein said substrate is of radiation transparent material and said film is of radiation opaque material.

10. The system claimed in claim 9 in which one slit of a plurality of pairs differs in width from the other slit of said plurality of pairs.

11. The system claimed in claim 10 in which said slits are curved and are disposed along a circle concentric with the axis of said disc.

References Cited

UNITED STATES PATENTS

| 1,512,785 | 10/1924 | Mittasch | 352—141 |
| 2,750,836 | 6/1956 | Fastie | 356—100 |
| 3,011,391 | 12/1961 | Fastie | 356—79 |

FOREIGN PATENTS 1,118,969  10/1966  Great Britain.

OTHER REFERENCES

"Spectrochemical Analysis," Norman H. Nachtrieb, McGraw-Hill Book Company Inc., 1950, pp. 87–89.

RONALD L. WIBERT, Primary Examiner

V. P. McGRAW, Assistant Examiner

U.S. Cl. X.R.

356—99, 256